(12) United States Patent
Miya et al.

(10) Patent No.: US 7,135,860 B2
(45) Date of Patent: Nov. 14, 2006

(54) VARIABLE RELUCTANCE RESOLVER INCLUDING ROTOR WITH MULTIPLE DETECTION PORTIONS

(75) Inventors: Taiichi Miya, Tokyo (JP); Taro Kasahara, Tokyo (JP); Toshisada Koyama, Miyota-Machi (JP)

(73) Assignee: Minebea Co., Ltd., Nagano-ken (JP)

( * ) Notice: Subject to any disclaimer, the term of this patent is extended or adjusted under 35 U.S.C. 154(b) by 21 days.

(21) Appl. No.: 10/901,293

(22) Filed: Jul. 29, 2004

(65) Prior Publication Data

US 2005/0035760 A1 Feb. 17, 2005

(30) Foreign Application Priority Data

Aug. 11, 2003 (JP) .............................. 2003-291223

(51) Int. Cl.
*G01B 7/30* (2006.01)
(52) U.S. Cl. ........................ 324/207.25; 324/207.17; 324/207.22; 310/68 B; 310/168; 318/661
(58) Field of Classification Search ............ 324/207.15, 324/207.16, 207.17, 207.22, 207.25, 207.23, 324/207.24, 207.26; 310/68 B, 168; 318/661
See application file for complete search history.

(56) References Cited

U.S. PATENT DOCUMENTS

| 5,148,070 | A | 9/1992 | Frye et al. |
| 5,189,353 | A | 2/1993 | Ezuka |
| 5,250,889 | A | 10/1993 | Ezuka |
| 5,780,997 | A | 7/1998 | Sutrina et al. |
| 6,137,204 | A | 10/2000 | Kuwahara |

| 2001/0045786 | A1* | 11/2001 | Sekine ................. 310/156.31 |
| 2003/0030349 | A1 | 2/2003 | Kobayashi et al. |

FOREIGN PATENT DOCUMENTS

| JP | 2000258187 A | * | 9/2000 |
| JP | A-2000-258187 | | 9/2000 |
| JP | A-2001-197610 | | 7/2001 |
| JP | 2002054949 A | * | 2/2002 |
| JP | 2002168652 A | * | 6/2002 |

OTHER PUBLICATIONS

Translation of the Detailed Description section of JP 2002168652 A obtained from Japanese Patent Office Website.*
Translation of the Detailed Description section of JP 2000258187 A obtained from Japanese Patent Office Website.*
Translation of the Detailed Description section of JP 2002054949 A obtained from Japanese Patent Office Website.*

\* cited by examiner

*Primary Examiner*—Edward Lefkowitz
*Assistant Examiner*—David M. Schindler
(74) *Attorney, Agent, or Firm*—Adduci, Mastriani & Schaumberg, L.L.P.

(57) ABSTRACT

A variable reluctance resolver has a rotor with magnetic poles with 2× or greater axis combination angles, and is structured so that reliable and accurate zero point detection can be carried out. Concave and convex portions are provided on at least two, but fewer than all, of the magnetic poles of the rotor, and the zero point detection winding is provided on a plurality of electrical poles of the stator. Two or more zero point detection signals are generated simultaneously by a plurality of zero point detection windings. Therefore, even if a portion of the zero point detection signals is lost, the zero point can still be identified based on the correlation between the two or more zero point detection signals.

20 Claims, 6 Drawing Sheets

VARIABLE RELUCTANCE RESOLVER INCLUDING ROTOR WITH MULTIPLE DETECTION PORTIONS

CROSS REFERENCE TO RELATED APPLICATION

This application is based on and incorporates by reference Japanese Patent Application No. 2003-291223, which was filed on Aug. 11, 2003.

BACKGROUND OF THE INVENTION

The present invention relates to a Variable Reluctance resolver (VR resolver) having a zero point detector, and in particular a VR resolver that is capable of accurately and reliably detecting a zero point of a resolver rotor by detecting multiple detection portions provided on the rotor.

A conventional VR resolver is effective as an incremental rotation sensor because a resolver output signal, which includes the sine signal and cosine signal output from a resolver output winding, is output n times per one revolution of the resolver rotor. FIG. 5 shows the correlation between an electrical zero point signal, the resolver output signal and the resolver angle with the axis combination angle nX, where nX=360°.

As graphically shown in FIG. 5, in a conventional resolver for which the axis combination angle nX is 2× or greater, detection of the absolute angle position cannot be executed because the same resolver output signals are repeatedly output n times per revolution of the resolver rotor. To solve this problem, an exemplary VR resolver having a zero point detector has been proposed.

FIGS. 6A–6B are explanatory drawings that show a conventional VR resolver having a zero point detector. In FIG. 6A, the zero point detector 101 of the conventional VR resolver has an excitation winding 103 and an n-phase output winding 104 on the ring-shaped stator 102. A rotor 105 is an iron-only core and is installed so that it can freely rotate relative to the stator 102. The gap permeance with the stator 102 is formed in a partial circle so that the shape of the sine wave portion of the resolver output signal varies relative to the rotation angle θ. A detection portion 107 formed in the rotor 105 is defined as a concave portion in the rotor 105, and a zero point detection winding 106 is located on the stator 102.

The zero point detector 101 detects the position of the detection portion 107 based on the output voltage, or zero point detection signal, Vx' that is output from the zero point detection winding 106. The zero point detection signal Vx' is, as shown in FIG. 6B, generated by and output from the zero point detection winding at the zero point of the rotation angle as the detection portion 107 rotates past the zero point detection winding 106. An example of such a conventional VR resolver is described in Japanese Patent Application 2000-258187.

Further regarding the above-described zero point detector 101, the zero point detection winding 106 is provided on a magnetic pole of the stator 102. As the rotor 105 includes only one detection portion 107, the zero point detection winding 106 only outputs the zero point detection signal Vx' for the rotation angles 0° and 360°.

The above-discussed VR resolver has an associated axis combination angle of 1×. When the axis combination angle is 2× or greater, a counter can be used to measure the zero point detection signal Vx'. As shown in FIG. 5, electrical zero point signals are output one at a time from 1 to n for every section where the sine and cosine output voltage signals of the sine winding and cosine winding complete one cycle, for example, every section of 1×, 2× . . . nX. The "1" point of the electrical zero point signal with respect to a count value of the counter occurs at the absolute angles 0° and 360°. However, as the counter measures 1 to n of the electrical zero point signals and converts these signals to an absolute angle, the absolute angle cannot be detected when the count value of the counter is lost due to an error such as a detection error. This is because the counter measures only one electrical zero point signal.

To overcome the above design limitation, a resolver such as that disclosed in Japanese Patent Application 2001-197610 may be connected in a redundant manner so that it operates accurately even if a detection error occurs. However, such a resolver is impractical from an implementation standpoint because it requires approximately twice the number of parts and configuration space compared to a resolver that does not include such a redundant connection.

Therefore, what is needed is a VR resolver with a rotor that has magnetic poles with 2× or greater axis combination angles, and that is structured to carry out accurate and reliable detection of a zero point detection signal.

SUMMARY OF THE INVENTION

In view of the above-mentioned limitations, a VR resolver of the present invention includes a rotor with concave or convex portions on at least two, and fewer than all, of the rotor magnetic poles, and a stator with zero point detection windings provided on a plurality of stator electrical poles. Two or more zero point detection signals (detection signals) are generated simultaneously by a plurality of zero point detection windings. Therefore, even if some of the detection signals are lost, the zero point may still be identified through correlation between the two or more of the simultaneously generated detection signals.

More specifically, a VR resolver of the present invention includes a rotor formed from a partial circular magnetic substance and supported with a shaft via a gap so that it can rotate freely within the stator. The rotor is structured so that the gap permeance that corresponds to the gap varies along with the value of the sine function that corresponds to the rotation angle. Zero point detection windings are provided on a plurality of magnetic poles of the stator. Magnetic poles are provided on the rotor, and concave or convex portions are provided on at least two, and fewer than all, of the rotor magnetic poles, so that the zero point detection windings detect the concave or convex portions.

The concave or convex portions may be provided on a plurality of magnetic poles of the rotor. Also, the zero point detection windings may be provided on the magnetic poles of the stator in correspondence to a plurality of the magnetic poles of the rotor, which are configured in series in the direction of rotation. Alternatively, the zero point detection windings may be provided on the magnetic poles of the stator in correspondence to all magnetic poles of the rotor.

With the VR resolver of the present invention, two or more detection signals are generated simultaneously rather than one, and two or more detection signals are detected simultaneously by a plurality of zero point detection windings to identify the zero point. Therefore, even if a detection signal is lost due to, for example, a detection error, the zero point can be detected with high precision and reliability. In addition, the detection signal can be detected as an incremental signal, and detection of the absolute angle position can also be carried out.

BRIEF DESCRIPTION OF THE DRAWINGS

The accompanying figures, in which like reference numerals refer to identical or functionally similar elements throughout the separate views and which, together with the detailed description below, are incorporated in and form part of the specification, serve to further illustrate various embodiments and to explain various principles and advantages all in accordance with the present invention.

DETAILED DESCRIPTION OF THE PREFERRED EMBODIMENTS

Figure 1B:
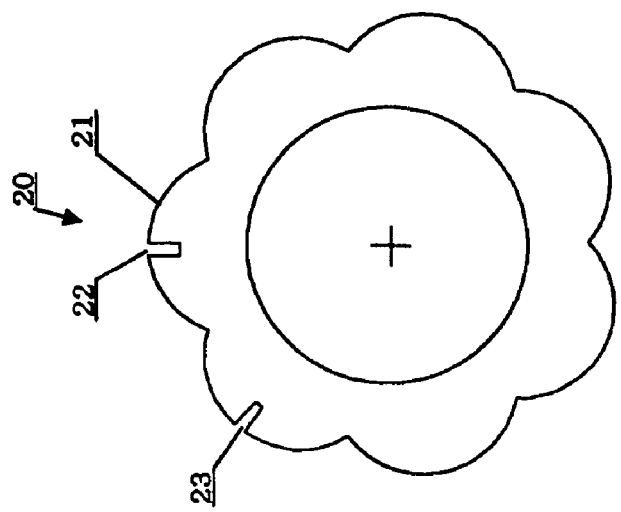
FIG. 1B is a block diagram of a corresponding rotor with a concave detection portion.

The VR resolver of the present invention will now be described in detail in accordance with the drawings. Illustration and description of components are omitted where not necessary for one skilled in the art to understand the present invention.

Referring to FIGS. 1A–1B and 2A–2B, a stator 10 of a VR resolver of the present invention includes a plurality of stator magnetic poles 12 on a magnetic stator yoke 11. An excitation winding 33, output windings that include a sine winding 31 and a cosine winding 32, and zero point detection windings 14 are wound around the stator magnetic poles 12. The marker windings are windings provided to detect the rotation angle of a resolver rotor 20. In addition, the marker windings serve as zero point detection windings.

Regarding the output windings, the sine winding 31 that outputs sine signals and cosine winding 32 that outputs cosine signals are provided so that the phases thereof are shifted by 90°. The excitation winding 33 to which an excitation input signal is applied, the sine winding 31 and the cosine winding 32 are commonly connected to a COM (common) terminal.

Figure 1A:
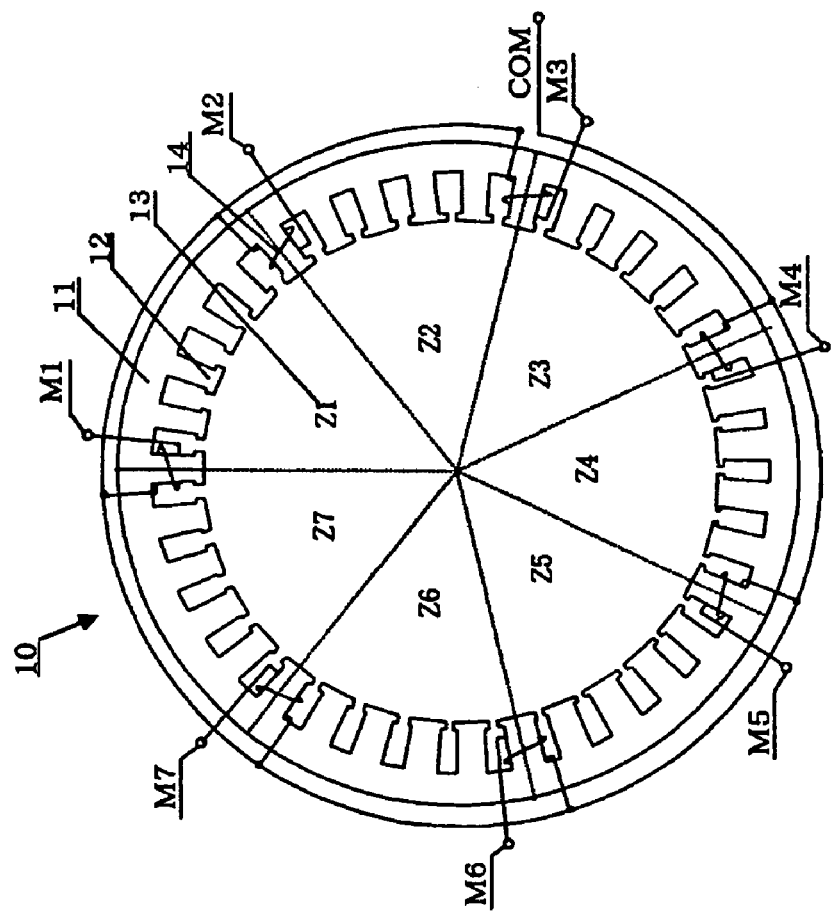
FIG. 1 is a block diagram of a stator with marker windings in a VR resolver of the present invention.

As shown in FIGS. 1A and 1B, the marker windings are provided in seven locations in correspondence to seven salient poles, or rotor magnetic poles, 21 on the rotor 20. The salient poles 21 of the rotor 20 are provided for every center angle. Therefore, the marker windings are provided on the stator magnetic poles 12 at respective equivalent center angle positions that correspond to the salient poles 21.

As shown in FIG. 1A, more specifically, the marker windings, or zero point detection windings, are formed on the stator magnetic poles 12 as seven marker windings, M1, M2, M3, M4, M5, M6 and M7 in the direction of rotor rotation. As shown in FIG. 2A, all of the marker windings M1–M7 are commonly connected to the COM (common) terminal, and have individual outputs.

Referring again to FIG. 1A, zones, represented generally by the zone at 13, are located between each of the marker windings M1–M7 and represent the angle areas between the marker windings M1–M7 where both marker signals are output (see Table 1 below). More specifically, the space between marker windings M1 and M2 is zone Z1; the space between marker windings M2 and M3 is Z2; the space between marker windings M3 and M4 is zone Z3; the space between marker windings M4 and M5 is zone Z4; the space between marker windings M5 and M6 is zone Z5; the space between marker windings M6 and M7 is zone Z6; and the space between marker windings M7 and M1 is zone Z7. The zones Z1-Z7 are used to identify between which adjacent marker windings a zero point is located.

The rotor 20 is a core made of a magnetic substance such as, for example, silicone steel, and includes the aforementioned seven salient poles. On at least two, and fewer than all, of the series of salient poles 21, concave portions 22, 23 are formed at a center thereof.

The concave portions 22, 23 can have arbitrary depths and widths as long as the concave portions 22, 23 are detectable by the marker windings M1–M7, so that the marker windings M1–M7 can generate and output corresponding marker signals. Every time the rotor 20 rotates a complete revolution, the concave portions 22, 23 on the rotor 20 are detected by the marker windings M1–M7 provided on the stator 10.

Alternatively, the salient poles 21 can include convex portions (not shown) can be used. As with the concave portions 22, 23, the convex portions can have any arbitrary length and width as long as the convex portions can be detected and corresponding marker signals can be generated and output by the marker windings M1–M7.

Figure 2B:
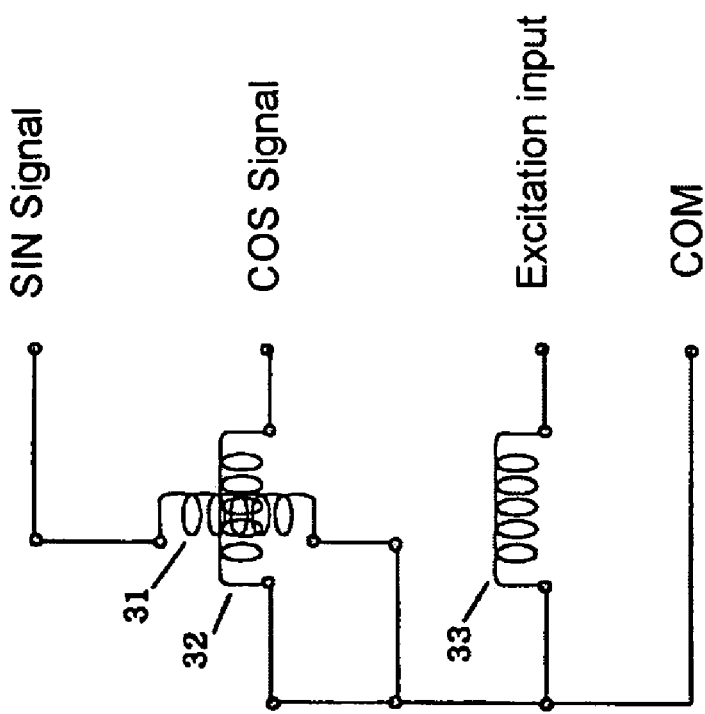
FIG. 2B is a schematic view of resolver input and output windings of the VR resolver of the present invention.
Figure 2A:
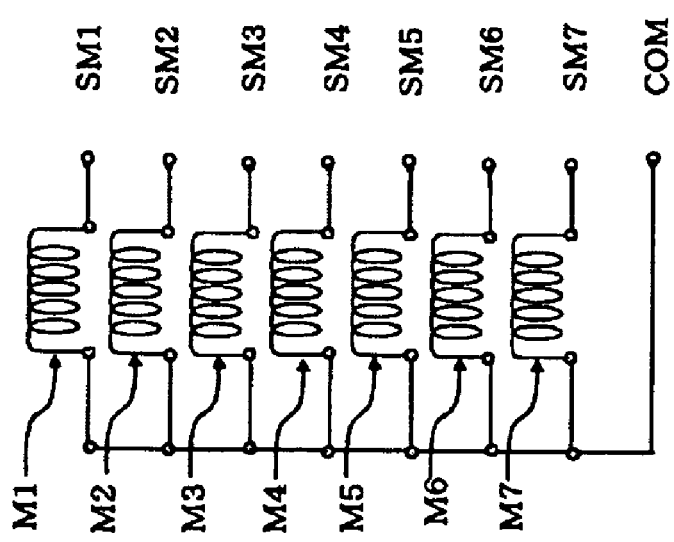
FIG. 2A is a schematic view of the marker windings of the stator in FIG. 1A.
Figure 3A:
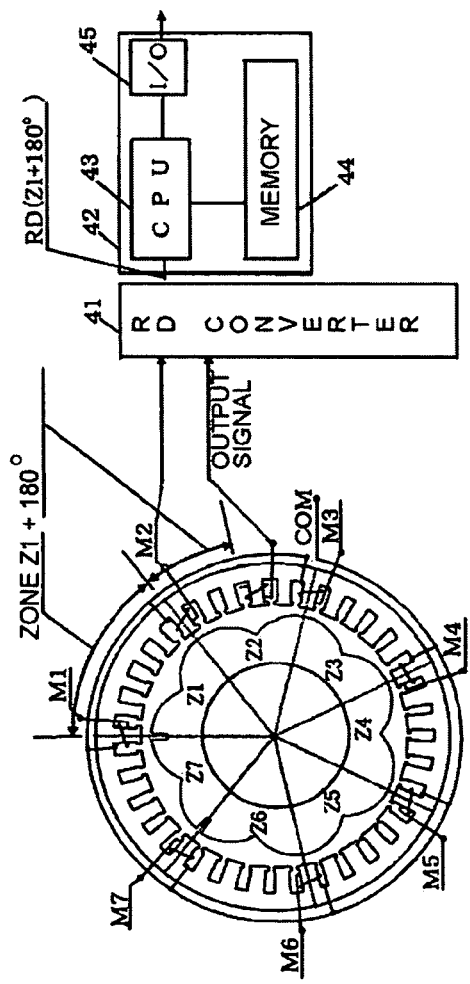
FIG. 3A is a block diagram of the VR resolver of the present invention and a corresponding signal processor, and FIG. 3B graphically illustrates the methodology utilized to find the resolver absolute angle.
Figure 3B:
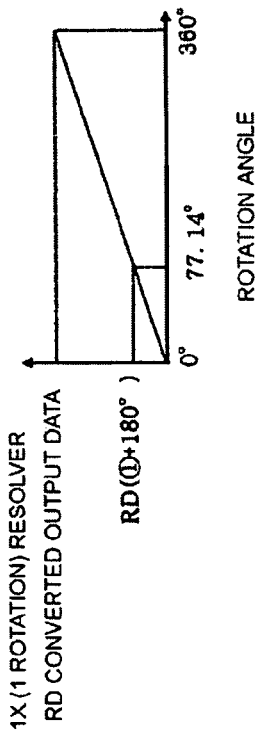

Referring now to FIGS. 2B and 3A–3B, the VR resolver of the present invention includes an excitation winding 33, output windings (sine winding 31 and cosine winding 32), and marker windings M1–M7 that are connected to a control device 42 via a resolver digital (RD) converter 41. The RD converter 41 and the control device 42 together form a signal processor. The control device 42 is a microcomputer including a central processing unit (CPU) 43, a memory 44, and an input/output (I/O) interface 45.

The output signals and marker signals of the VR resolver are RD converted via the RD converter 41 and then read by the control device 42. The marker signals, which are detected as incremental, or amplified, signals, are used as zero point detection signals and then are then used for detection of absolute angle positions. The control device 42 outputs the absolute angle signals and zero point detection signals based on the read signals after performing designated signal processing that will now be described in more detail.

The process for measuring the zero point of the rotor 20 is described as follows. When the concave portions 22, 23 of the rotor 20 are detected by the marker windings M1–M7 on the stator 10, marker signals for every marker winding are output in series one at a time at the beginning of what is referred to as an advance zone and at the beginning of a later zone. Put another way, the zero point detection signals are output in series from two consecutive and adjacent marker windings, with the timing being referenced from the first of the two zones, in the direction of rotation of the rotor 20.

Figure 4:
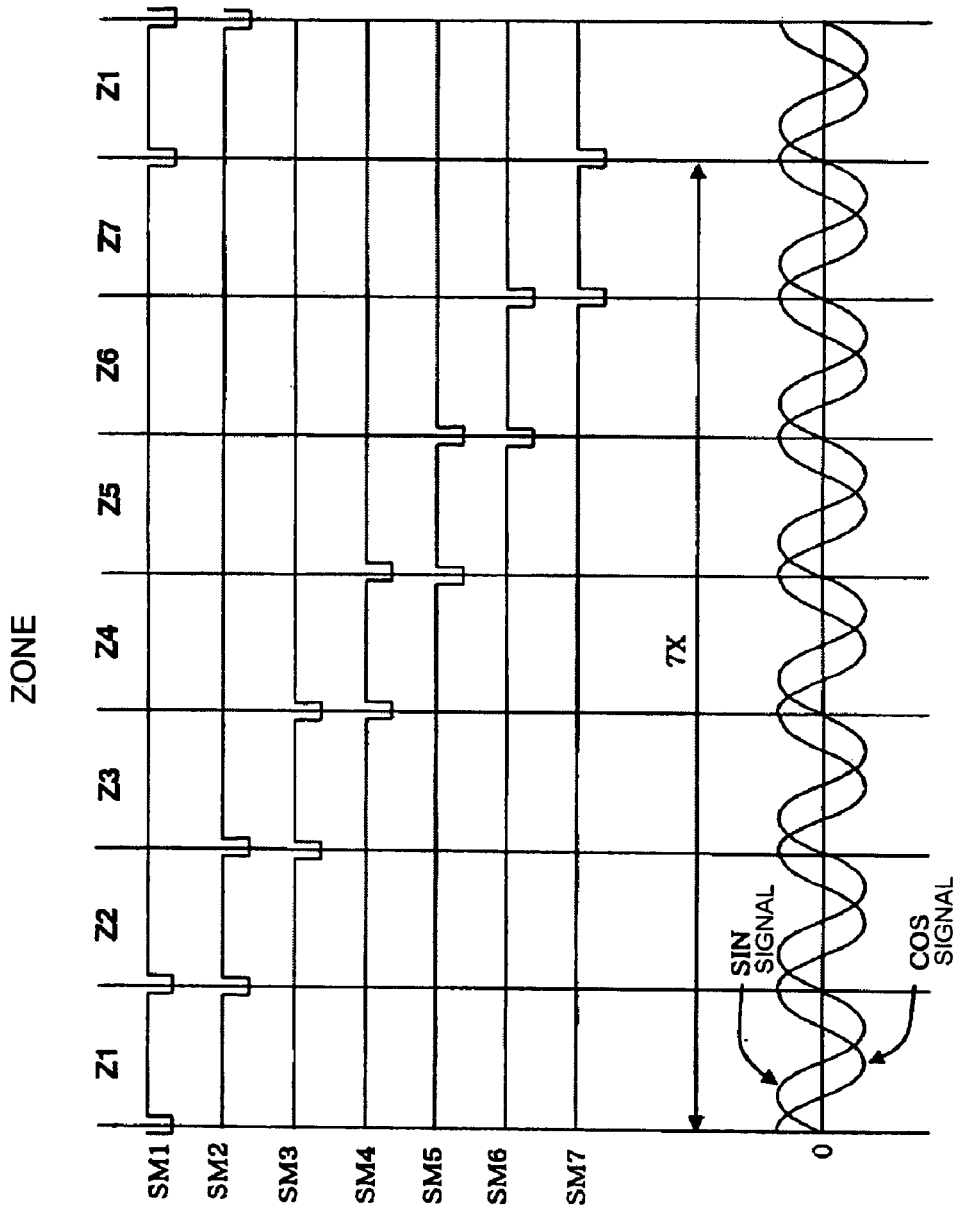
FIG. 4 is a graph that shows the correlation between the marker signals, the resolver output signals and the zone of the VR resolver of the present invention with an axis combination angle 7x.
Figure 5:
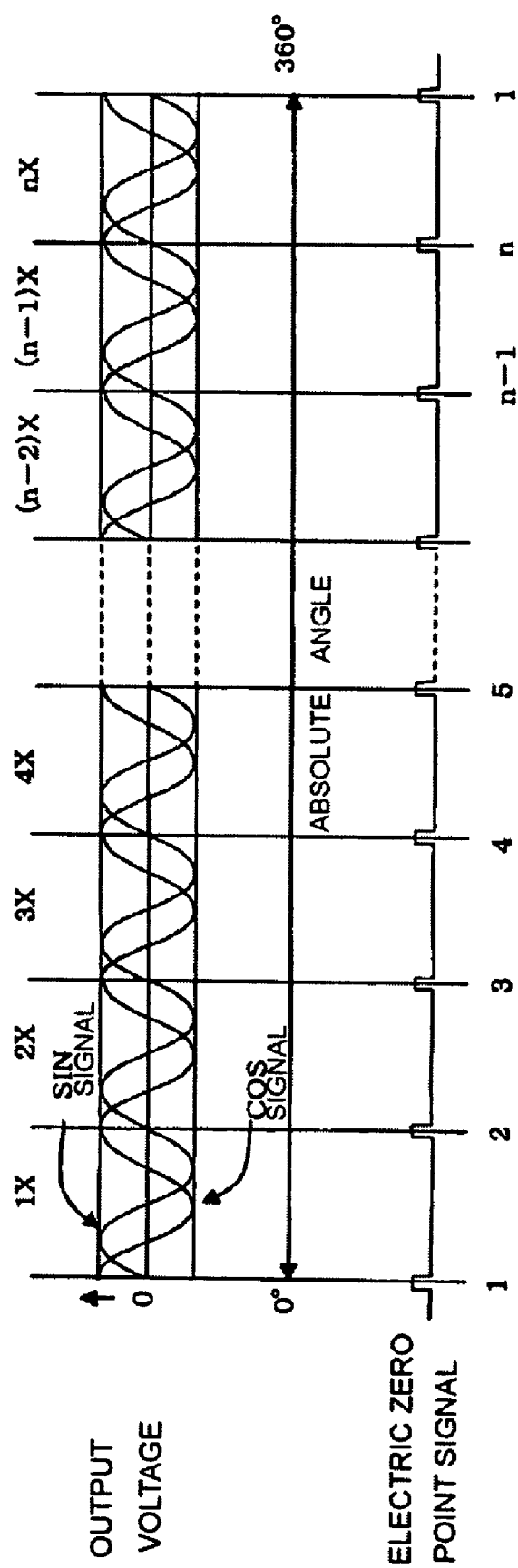
FIG. 5 is a graph that shows the correlation between an electrical zero point signal, resolver output signals and a resolver angle in a prior art resolver with an axis combination angle nX.
Figure 6A:
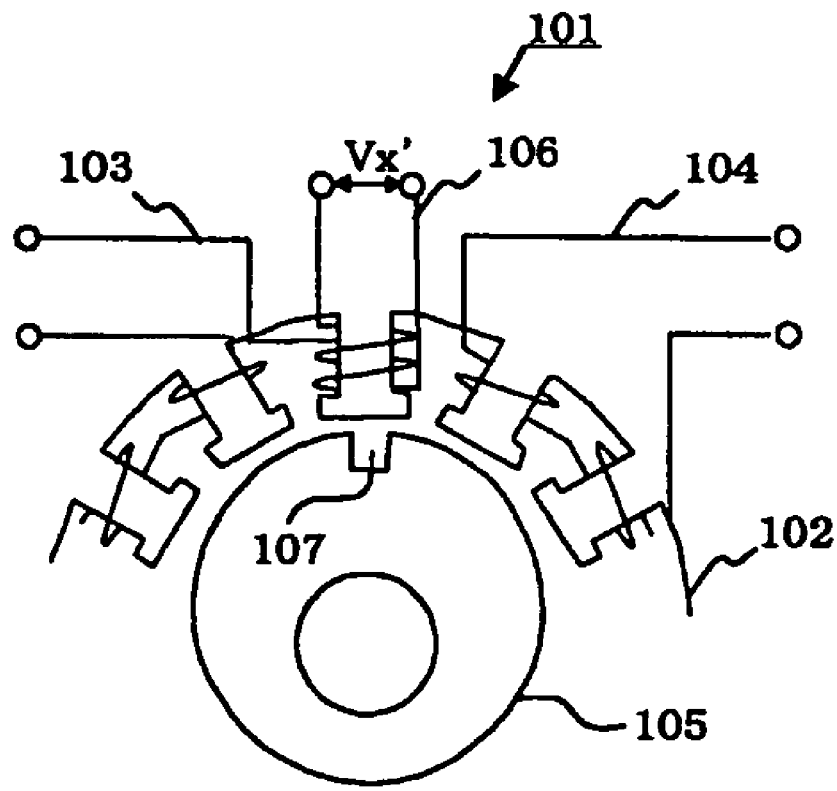
FIG. 6A is a schematic view of a prior art VR resolver including a zero point detector.
Figure 6B:
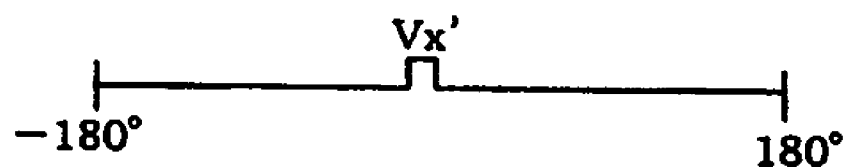
FIG. 6B is a graph that shows a zero point detection signal output by the VR resolver of FIG. 6A.

These marker signals are detected by the RD converter 41 and control device 42 shown in FIG. 3B, for determining the zone variation characteristics for the marker signals as shown in FIG. 4, and are then stored. At the same time, sine signals and cosine signals are respectively output from the sine winding 31 and the cosine winding 32 as the resolver output signals (output voltage signals) for every zone during a complete revolution of the rotor 20.

During normal resolver operation, the zero point detection signals are output in series from two adjacent and consecutive marker windings. During abnormal operation, when the zero point detection signals are partially lost, a zero point is accurately detected by supplementing the partially lost zero point detection signals based on the zero point detection signals being output in series from consecutive marker windings during normal operation.

As a result, when one marker winding is provided at the 0° position of the absolute angle (1×), the zero point of the absolute angle can be determined with a high degree of accuracy. In addition, an angle point other than the 0° position of the absolute angle can be found in a similar manner.

In addition, the concave portions provided on the salient poles 21 of the rotor 20 can be, for example, a combination of two salient poles located on every other pole instead of on consecutive salient poles. In such a configuration, three poles make up the simultaneously detected marker windings, and the combination of the signals for these three poles is output by changing the angle along with the rotation of the rotor 20.

Even if one of these combined marker signals for the three poles is lost, the lost marker signal can be supplemented based on the regulation of the combination of marker signals for three poles, and therefore an accurate zero point can be detected.

It should be appreciated at this point that the number of concave portions provided on the salient poles of the rotor 20 and the number of combinations of the marker signals can be appropriately selected.

Referring back to FIG. 1, the angle range for every axis combination angle is provided as different zones, and more specifically zones Z1–Z7, in a consecutive manner in the direction of rotation of the rotor 20. The marker windings M1–M7 used to find each zone are provided at respective borders that divide each zone. The marker windings can be also used as detection windings for detecting the zero position of the absolute angle, which is the angular location of the rotor relative to its zero point. For example, when the axis combination angle is 7×, the angle per zone takes the following value: 360°/7=51.428571°. An exemplary angle range of each zone is shown in Table 1:

TABLE 1

| Zone | Angle range |
| --- | --- |
| (Z1) | 0° to 51.428571° |
| (Z2) | 51.428571° to 102.857143° |
| (Z3) | 102.857143° to 154.285714° |
| (Z4) | 154.285714° to 205.714286° |
| (Z5) | 205.714286° to 257.142857° |
| (Z6) | 257.142857° to 308.571429° |
| (Z7) | 308.571429° to 360° |

A zone determination methodology will now be discussed. As shown in FIG. 1, concave portions 22, 23 are provided on the rotor 20 on two consecutive salient poles among the seven equidistantly and circumferentially spaced salient poles in the range of zones Z1–Z7.

On the stator 10, similarly, the seven marker windings M1–M7, which correspond to the above-mentioned salient poles 21, are also equally and circumferentially spaced around the angle range of the zones Z1–Z7. When the rotor 20 rotates, as shown in FIG. 4, marker signals SM1–SM7 are output from the marker windings M1–M7 at the respective starting angle positions of each of the zones Z1–Z7. One cycle's worth of the output signals (sine signals and cosine signals) is output from each of the output windings for each of the zones Z1–Z7.

When the marker signals are simultaneously output on two consecutively configured marker windings, the RD converter 41 and control device 42, which form the signal processor shown in FIG. 3A, detect and store the zone variation characteristics of the marker signals shown in FIG. 4, and then determine the particular zones in which the concave portions 22, 23 of the rotor 20 are located.

Under abnormal conditions, when the zero point detection signals are partially lost, the correct zero point is detected by partially supplementing the lost zero point detection signals based on the fact that the zero point detection signals are output in series from two consecutive marker windings under normal conditions, and the zone variation characteristics of the marker signals as shown in FIG. 4 are found. The zero point detection signals are then processed as under normal conditions, and the zone location of the concave portions 22, 23 of the rotor 20 are determined.

For example, when the first zone Z1 is selected, if the first zone starting marker signal SM1 and the second zone starting marker signal SM2 are simultaneously measured, the signal processor determines the zone to be zone Z1. The conditions for the zone determination are as shown in the following Table 2.

TABLE 2

| Marker signals | | | | | | | |
| --- | --- | --- | --- | --- | --- | --- | --- |
| M1 | M2 | M3 | M4 | M5 | M6 | M7 | Zone |
| O | O | X | X | X | X | X | (Z1) |
| X | O | O | X | X | X | X | (Z2) |
| X | X | O | O | X | X | X | (Z3) |
| X | X | X | O | O | X | X | (Z4) |
| X | X | X | X | O | O | X | (Z5) |
| X | X | X | X | X | O | O | (Z6) |
| O | X | X | X | X | X | O | (Z7) |

Operation of the marker signals O = On X = Off

In the VR resolver of the present invention, there are two salient poles with concave portions, and there are seven marker windings among the seven salient poles. However, the above described zone determination method is also applicable to embodiments with different numbers of salient poles and marker windings. In addition, if the number of concave portions on the rotor is increased, the above described zone determination method provides for determination of wider zones.

The absolute angle position is detected by detecting the zero point detection signal as an incremental signal. The angle conversion calculation is carried out such that the marker signals and output signals for the VR resolver are RD converted (zone Z1 and 180°) by the RD converter 41 and then are read into the control device 42.

As shown in FIG. 4, the output windings (the sine winding 31 and the cosine winding 32), output the electrical angle signals ($\theta_e$) from 0° to 360° for every zone (every axis combination angle). The 1× angle signal can be found by implementing the following Formula 1 in the control device 42, when the mechanical angle is $\theta_m$ and when the selected zone is considered to be "Z" (1 to 7):

$$\theta_m = [(Z-1)/7] \times 360 + \theta_e/7 \qquad (1)$$

For example, with Z=1 to 7, in the case of the second zone Z2, and with the electrical angle=180°, the 1× angle is found by the following Formula 2:

$$\theta_m = [(2-1)/7] \times 360° + 180°/7 \qquad (2)$$
$$= 51.428571° + 25.714286°$$
$$= 77.142857°$$

The angle of 77.142857° is the 1× angle as shown in FIG. 3B when the RD conversion output data for a 1× (one rotation) resolver is an RD (zone 1+180°) signal, and is converted and indicated as the rotation angle 77.14° from the linear relative correlation.

Based on the marker windings and the output signals, the absolute angle of the resolver can therefore be found using the above-mentioned formula. The resolver absolute angle can also be found in a similar manner when the number of zones and the number of salient poles are other than seven.

The above described embodiment of the present invention utilizes a rotor with seven salient poles, with concave portions provided on two consecutive poles, and with marker windings individually provided on seven stator magnetic poles that correspond to the salient poles of the rotor. Therefore, the above configuration enables the zero point and the absolute angle position to be accurately determined in the case of arbitrary axis combination angles.

The number of salient poles on the rotor should be at least two, and the number of salient poles of the rotor having a concave portion for detection should be two. An arbitrary number of stator poles from two up to the total number of salient poles of the marker windings should be provided in correspondence to the salient poles of the rotor. As a result, the detection of 0° on the absolute angle allows the detection of the electrical zero point that comprises the starting point of the arbitrary zone, as well as the detection of the absolute angle by using each of the zero point detection signals as an incremental signal.

The number of salient poles having a concave portion should be an arbitrary number from two to the entire number of salient poles minus one. Therefore, the detection signals with a concave portion and without a concave portion can be output to enable post-processing of the detected signals.

In addition to the above discussed VR resolver, the above described rotor/stator configuration is also applicable to VR angle detectors, VR angle sensors and VR tachometers that require similar accurate and reliable angle detection features.

The disclosure is intended to explain how to fashion and use various embodiments in accordance with the invention rather than to limit the true, intended and fair scope and spirit thereof, and is not intended to be exhaustive or to limit the invention to the precise form disclosed. Modifications or variations are possible in light of the above teachings. The embodiments were chosen and described to provide the best illustration of the principles of the invention and its practical application, and to enable one of ordinary skill in the art to utilize the invention in various embodiments and modifications as are suited to the particular use contemplated, and which fall within the scope of the invention as determined by the appended claims, and all equivalents thereof, when interpreted in accordance with the breadth to which they are fairly, legally, and equitably entitled.

The invention claimed is:

1. A variable reluctance resolver, comprising:
   a stator including a plurality of stator magnetic poles;
   a shaft extending axially through the stator;
   a magnetic rotor located within the stator and including a plurality of rotor magnetic poles, the rotor being supported by the shaft so that a gap is defined between the rotor and the stator, thereby enabling the rotor to rotate freely within the stator, wherein
   a gap permeance varies with a sine function signal that corresponds to a rotation angle of the rotor, and detection portions are provided on at least two, and fewer than all, of the rotor magnetic poles; and
   zero point detection windings provided on the plurality of stator magnetic poles for detecting the detection portions of the rotor magnetic poles.

2. The variable reluctance resolver of claim 1, wherein the detection portions are provided on certain of the plurality of rotor magnetic poles that are configured in series in a direction of rotation of the rotor.

3. The variable reluctance resolver of claim 2, wherein the zero point detection windings provided on the plurality of stator magnetic poles correspond to the certain of the plurality of rotor magnetic poles that are configured in series in the direction of rotation of the rotor.

4. The variable reluctance resolver of claim 1, wherein the zero point detection windings provided on the plurality of stator magnetic poles correspond to certain of the plurality of rotor magnetic poles that are configured in series in a direction of rotation of the rotor.

5. The variable reluctance resolver of claim 2, wherein the zero point detection windings provided on the plurality of stator magnetic poles correspond to all of the plurality of rotor magnetic poles.

6. The variable reluctance resolver of claim 1, wherein the zero point detection windings provided on the plurality of stator magnetic poles correspond to all of the plurality of rotor magnetic poles.

7. The variable reluctance resolver of claim 1, wherein the detection portions provided on at least two, and fewer than all, of the rotor magnetic poles comprise concave detection portions.

8. The variable reluctance resolver of claim 2, wherein the detection portions provided on at least two, and fewer than all, of the rotor magnetic poles comprise concave detection portions.

9. The variable reluctance resolver of claim 1, further comprising a signal processor for processing at least two, and fewer than all, zero point detection signal generated by the zero point detection windings to ensure accurate detection of a zero point.

10. The variable reluctance resolver of claim 9, wherein the signal processor is configured to determine a resolver absolute angle based on a number of zones defined by the zero point detection winding and on the zero point detection signals generated by the zero point detection windings in response to rotation of the rotor.

11. A zero point detection apparatus for a variable reluctance resolver, comprising:
    a magnetic rotor including a plurality of rotor magnetic poles, and detection portions provided on at least two, and fewer than all, of the rotor magnetic poles; and
    a stator including a plurality of stator magnetic poles and in which the rotor is rotatably located, the stator including zero point detection windings on the plurality of stator magnetic poles for detecting the detection portions of the rotor magnetic poles during rotation of the rotor.

12. The zero point detection apparatus of claim 11, wherein the detection portions are provided on certain of plurality of rotor magnetic poles that are configured in series in a direction of rotation of the rotor.

13. The zero point detection apparatus of claim 12, wherein the zero point detection windings provided on the plurality of stator magnetic poles correspond to the certain of the plurality of rotor magnetic poles that are configured in series in the direction of rotation of the rotor.

14. The zero point detection apparatus of claim 11, wherein the zero point detection windings provided on the plurality of stator magnetic poles correspond to certain of the plurality of rotor magnetic poles that are configured in series in a direction of rotation of the rotor.

15. The zero point detection apparatus of claim 12, wherein the zero point detection windings provided on the plurality of stator magnetic poles correspond to all of the plurality of rotor magnetic poles.

16. The zero point detection apparatus of claim 11, wherein the zero point detection windings provided on the plurality of stator magnetic poles correspond to all of the plurality of rotor magnetic poles.

17. The zero point detection apparatus of claim 11, wherein the detection portions provided on at least two, and fewer than all, of the rotor magnetic poles comprises concave detection portions.

18. The zero point detection apparatus of claim 12, wherein the detection portions provided on at least two, and fewer than all, of the rotor magnetic poles comprise concave detection portions.

19. The zero point detection apparatus of claim 11, further comprising a signal processor for processing at least two, and fewer than all, zero point detection signals generated by the zero point detection windings to ensure accurate detection of a zero point.

20. The zero point detection apparatus of claim 19, wherein the signal processor is configured to a determine a resolver absolute angle based on a number of zones defined by the zero point detection windings and on the zero point detection signals generated by the zero point detection windings in response to rotation of the rotor.

* * * * *

UNITED STATES PATENT AND TRADEMARK OFFICE
CERTIFICATE OF CORRECTION

| | | |
|---|---|---|
| PATENT NO. | : 7,135,860 B2 | Page 1 of 1 |
| APPLICATION NO. | : 10/901293 | |
| DATED | : November 14, 2006 | |
| INVENTOR(S) | : Taiichi Miya, Taro Kasahara and Toshisada Koyama | |

It is certified that error appears in the above-identified patent and that said Letters Patent is hereby corrected as shown below:

COL. 20, LINE 16-21, DELETE CLAIM 20, AND REPLACE WITH THE FOLLOWING:

20. The zero point detection apparatus of claim 19, wherein the signal processor is configured to determine a resolver absolute angle based on a number of zones defined by the zero point detection windings and on the zero point detection signals generated by the zero point detection windings in response to rotation of the rotor.

Signed and Sealed this

Fifth Day of June, 2007

JON W. DUDAS
*Director of the United States Patent and Trademark Office*